Aug. 9, 1932.  W. T. WITT  1,870,939
TRAILER
Filed March 31, 1931  2 Sheets-Sheet 1

Inventor
W. T. Witt
By C. A. Snow & Co.
Attorneys.

Aug. 9, 1932. W. T. WITT 1,870,939
TRAILER
Filed March 31, 1931 2 Sheets-Sheet 2
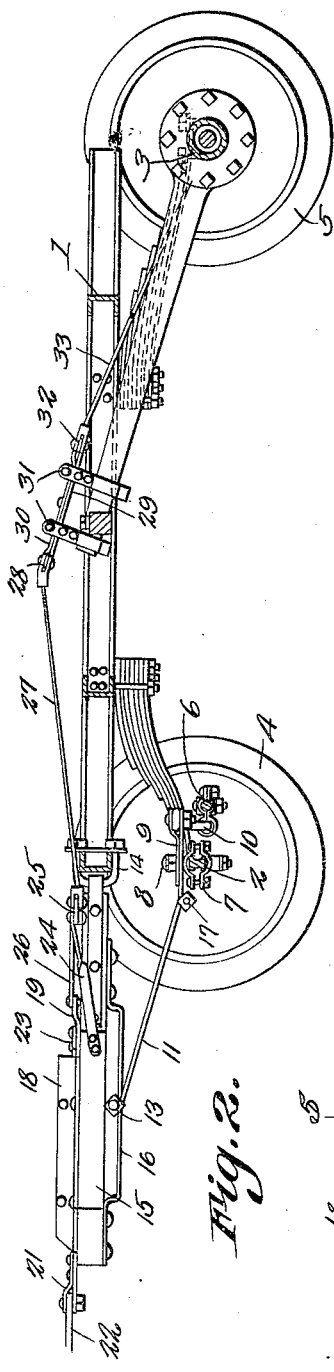
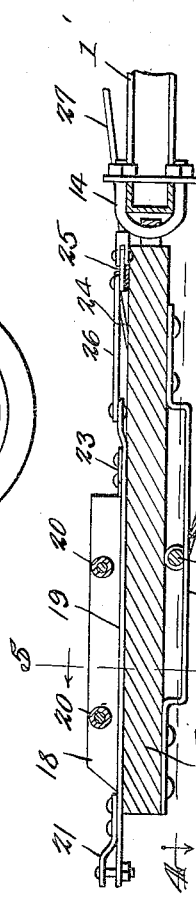
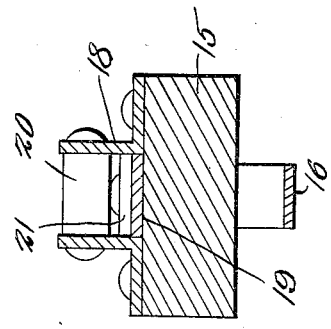
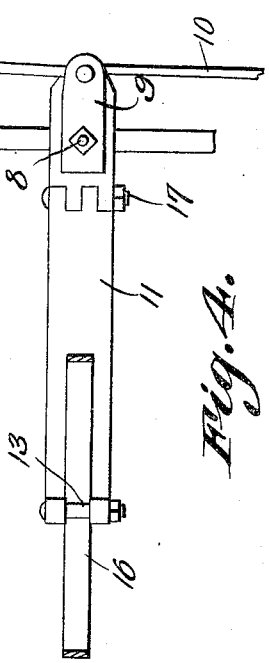
Inventor
W. T. Witt
By C A Snow & Co.
Attorneys.

Patented Aug. 9, 1932

1,870,939

UNITED STATES PATENT OFFICE

WILEY T. WITT, OF MOODY, TEXAS

TRAILER

Application filed March 31, 1931. Serial No. 526,730.

This invention relates to a trailer, one of the objects being to provide a device of this character having means whereby brakes will be applied automatically to the trailer when traveling down hill in the rear of a motor vehicle to which the trailer is connected, thereby to prevent the trailer from crowding against the vehicle and subjecting it to undesired strain.

A further object is to provide a means for turning the front wheels of the trailer automatically so that they will properly track the wheels of the draft vehicle.

A still further object is to provide simple and efficient means for coupling the trailer to the vehicle in advance thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings:

Figure 2 is a section on line 2—2, Figure 1.

Figure 3 is an enlarged section through the draft tongue and adjacent parts, said section being taken on the line 3—3, Figure 1.

Figure 4 is a section on line 4—4, Figure 3.

Figure 5 is an enlarged section on line 5—5, Figure 3.

Figure 1:
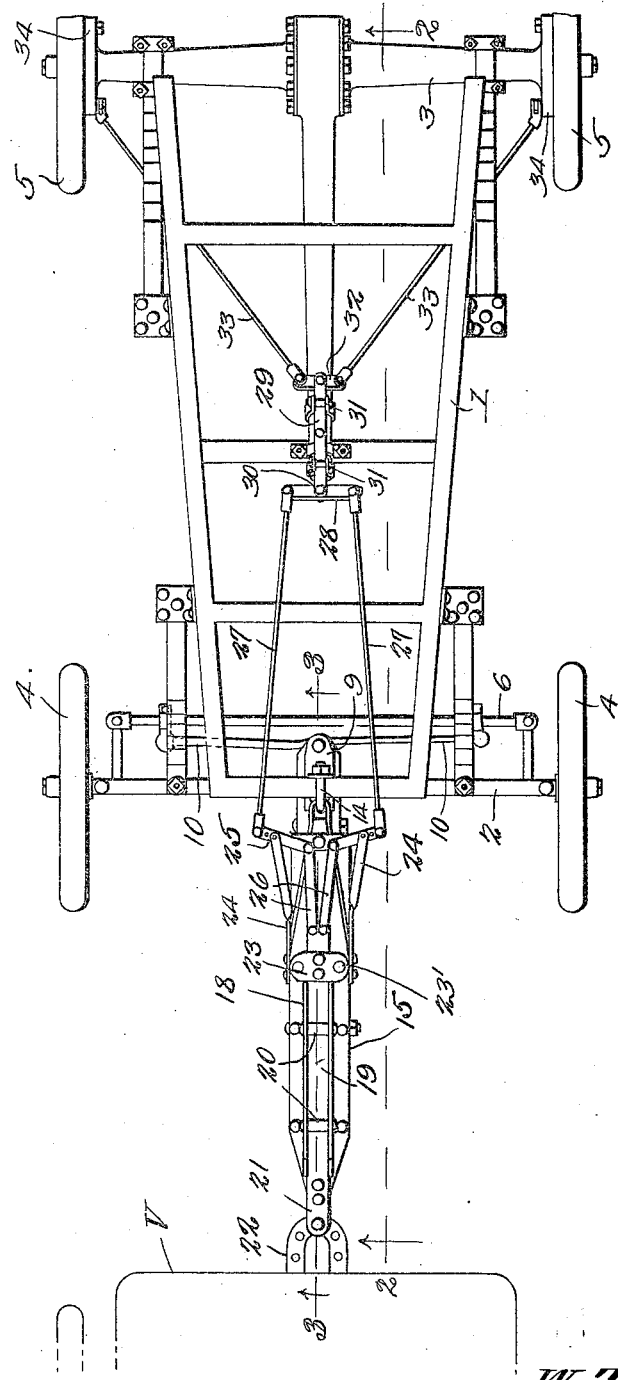
Figure 1 is a plan view of the trailer and the means for connecting it to a vehicle, the body of the trailer being removed.

Referring to the figures by characters of reference, 1 designates the frame of a trailer which can be mounted in any desired manner upon the front axle 2 and the rear axle 3, said axles being supported by wheels 4 and 5, respectively. The wheels 4 are connected in the usual way by a rod 6 so that they will be turned in unison when said rod is shifted transversely of the frame.

A clamp 7 engages the front axle 2 and has a pivot stud 8 on which is mounted a lever 9 the rear end of which is connected by rods 10 to rod 6. To the front end of this lever is hingedly connected a coupling tongue 11 the front end of which is forked as shown at 12 and provided with a cross pin 13.

To the front end of frame 1 is attached a yoke 14 on which is pivotally mounted a draft tongue 15. A guide strip 16 is secured to the bottom of this tongue and extends longitudinally thereof. This strip extends through forked end 12 and under pin 13 so as to constitute a guide for the pin. Thus when tongue 15 is swung upwardly and downwardly relative to the frame 1, the coupling tongue 11 can also swing upwardly and downwardly about its hinge 17, the pin 13, during this operation, sliding back and forth along the guide strip 16.

Secured on the draft tongue 15 are parallel guides 18 and mounted between these guides is an elongated slide 19. Rollers 20 are supported between the guides above slide 19 and serve to prevent displacement of the slide relative to tongue 15.

A yoke 21 is provided at the front end of the slide for pivotal connection with a clevis 22 or the like connected to a vehicle V and forward movement of the slide 19 relative to the tongue 15 and guides 18 is limited by a stop plate 23 which is attached to the slide and adapted to abut against the back ends of guides 18. This plate has holes 23' in its end portions whereby a draft tongue can be attached thereto should it be found desirable to pull the trailer with animals.

Pivotally connected to arms 24, arranged at the sides of tongue 15, are levers 25 which extend toward each other, the inner arms of these levers being connected by links 26 to the back end of slide 19. The outer or short arms of the levers are connected by rods 27 to an equalizing cross head 28 pivotally mounted at its center on a slide 29 as shown at 30. This slide is supported in brackets 31 secured to a portion of the frame and the rear end of slide 29 has another equalizing cross head 32. The ends of this cross head are connected by rods 33 to brakes indicated generally at 34 connected to the wheels 5.

Under normal conditions, while the trailer is being drawn by vehicle V, stop plate 23 thrusts against guides 18 so that a draft is transmitted from slide 19 to guides 18 and tongue 15 and the trailer is caused to follow the vehicle. As the vehicle makes a turn the tongue 15 will be swung about its connection with the frame and at the same time the coupling tongue 11 will swing lever 9 and cause the wheels 4 to be turned to the proper angles.

Should the trailer be traveling down hill and tend to crowd upon the draft vehicle, the tongue 15 would move forwardly relative to slide 19. As the inner or short arms of levers 25 would at this time be anchored by links 26, said movement of tongue 15 would cause the outer ends of the levers to pull forwardly on rods 27, thereby exerting a pull through cross head 28, slide 29 and cross head 32 to rods 33, thereby applying the brakes and retarding the forward movement of the trailer.

The action of the brakes will take place irrespective of the angle at which the tongue 15 is supported relative to the axle 2 and frame 1.

What is claimed is:

1. A trailer including a wheel-supported structure having a brake, a draft tongue extending from said structure, an element mounted thereon for attachment to a draft device, said element and tongue being mounted for relative movement, means for transmitting draft from said element to the tongue to propel the trailer forwardly, means operated by the forward movement of the trailer and the tongue relative to said element for applying the brake, said means including a slide, spaced equalizers carried thereby, brake connections attached to one of the equalizers, and lever and link connections between the other equalizer and the tongue and element.

2. A trailer including a wheel-supported structure having brakes, a draft tongue connected to said structure and mounted to swing relative thereto, steering mechanism actuated by said tongue, a member connected to the tongue for attachment to a draft device, said member and tongue being mounted for relative sliding movement, guiding means for the tongue and member, means on said member and cooperating with the guiding means for transmitting forward draft from said member to the tongue, means operated by backward movement of said member when subjected to thrust for applying the brakes, said means including a slide, equalizing heads thereon, connections between one of the heads and brakes, levers carried by the tongue, connections between the levers and the member, and connections between said levers and the other head.

In testimony that I claim the foregoing as my own, I have hereto affixed my signature.

WILEY T. WITT.